(12) United States Patent
Dadheech et al.

(10) Patent No.: US 10,512,150 B2
(45) Date of Patent: Dec. 17, 2019

(54) SYSTEMS AND APPARATUSES FOR HIGH PERFORMANCE ATMOSPHERE THIN FILM PIEZOELECTRIC RESONANT PLASMAS TO MODULATE AIR FLOWS

(71) Applicant: GM GLOBAL TECHNOLOGY OPERATIONS LLC, Detroit, MI (US)

(72) Inventors: Gayatri V. Dadheech, Bloomfield Hills, MI (US); Bahram Khalighi, Birmingham, MI (US); Taeyoung Han, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 15/970,221

(22) Filed: May 3, 2018

(65) Prior Publication Data
US 2019/0342985 A1 Nov. 7, 2019

(51) Int. Cl.
*B60J 9/00* (2006.01)
*H05H 1/24* (2006.01)
*B62D 35/02* (2006.01)

(52) U.S. Cl.
CPC ........... *H05H 1/2406* (2013.01); *B62D 35/02* (2013.01)

(58) Field of Classification Search
CPC .... Y10S 428/90; Y10T 428/265; Y10T 29/42; G11B 5/72; H01L 2924/0002; C23C 14/32; B22F 3/14; B22F 2998/00; B22F 2998/10; B22F 9/008
See application file for complete search history.

(56) References Cited

U.S. PATENT DOCUMENTS

| | | | | |
|---|---|---|---|---|
| 5,414,324 A * | 5/1995 | Roth | ...................... | B29C 59/14 118/723 E |
| 6,796,532 B2 * | 9/2004 | Malmuth | .................. | B64C 5/12 244/204 |
| 7,380,756 B1 * | 6/2008 | Enloe | .................... | B64C 23/005 244/130 |
| 7,984,614 B2 * | 7/2011 | Nolcheff | ............... | F23C 99/001 60/726 |
| 8,091,950 B2 * | 1/2012 | Corke | .................... | B62D 35/00 296/180.1 |
| 8,308,112 B2 * | 11/2012 | Wood | .................... | B64C 23/005 244/203 |
| 8,453,457 B2 * | 6/2013 | Ginn | ....................... | F02K 1/386 239/265.19 |
| 8,916,795 B2 * | 12/2014 | McClure | ............... | B64C 23/005 219/121.48 |
| 9,067,674 B2 * | 6/2015 | Nordin | .................. | B64C 23/005 |
| 9,145,874 B2 * | 9/2015 | Slough | .................. | F03H 1/0081 |

(Continued)

*Primary Examiner* — Kiran B Patel
(74) *Attorney, Agent, or Firm* — Lorenz & Kopf, LLP

(57) ABSTRACT

Systems and apparatuses for applying a plasma actuator system for reducing aerodynamic drag of a vehicle by discharging plasma is provided. The system includes: at least one pair of thin films configured to integrate into a pair of electrodes wherein each of the thin films of the pair of thin films is composed of a thin film piezo-electric material; a dielectric configured as an insulator region to separate each electrode integrated with the thin film piezo-electric material; and a power supply to deliver alternating current to each electrode to provide a high voltage output obtained by the thin film piezo-electric material integrated with the pair of electrodes wherein the high voltage output is about 10 kV.

15 Claims, 5 Drawing Sheets

(56) References Cited

U.S. PATENT DOCUMENTS

| | | | |
|---|---|---|---|
| 9,446,840 B2 * | 9/2016 | Drouin, Jr. | B64C 23/005 |
| 9,541,106 B1 * | 1/2017 | Patel | F15D 1/0065 |
| 9,771,146 B2 * | 9/2017 | Nikic | B64F 5/40 |
| 9,848,485 B2 * | 12/2017 | Corke | H05H 1/2406 |
| 9,955,564 B2 * | 4/2018 | Griebeler | H05H 1/2406 |
| 10,011,344 B1 * | 7/2018 | Santavicca, Jr. | B64C 1/38 |
| 10,227,923 B2 * | 3/2019 | Merlo | B64D 15/12 |
| 2008/0067283 A1 * | 3/2008 | Thomas | B64C 21/00 244/1 N |
| 2009/0212164 A1 * | 8/2009 | Osborne | B64C 23/005 244/205 |
| 2015/0267727 A1 * | 9/2015 | Segawa | F04D 29/681 313/231.31 |
| 2017/0297634 A1 * | 10/2017 | Han | B62D 35/00 |
| 2018/0065690 A1 | 3/2018 | Han et al. | |

\* cited by examiner

SYSTEMS AND APPARATUSES FOR HIGH PERFORMANCE ATMOSPHERE THIN FILM PIEZOELECTRIC RESONANT PLASMAS TO MODULATE AIR FLOWS

TECHNICAL FIELD

The technical field generally relates to transportation vehicles such as automobiles and, more specifically, use of a plasma configuration integrated with a piezoelectric resonator for generating jet flows around a vehicle to reduce aerodynamic drag.

INTRODUCTION

Regulatory agencies including the U.S. Environmental Protection Agency (EPA) and the U.S. Department of Transportation's National Highway Traffic Safety Administration (NHTSA) issue national standards which require improvements in fuel efficiency for vehicles in order to cut carbon pollutions. To meet these national standards, factors affecting fuel economy are considered in vehicle design including aerodynamic drag. That is, reductions in aerodynamic drag have a significant effect in enhancing fuel efficiency as well as achieving other desired goals including consumer savings realized by reduced fuel consumptions when operating a vehicle.

Accordingly, it is desirable to generate air flow around a vehicle to reduce aerodynamic drag using a high voltage piezoelectric transformer with a thin film piezo electric material and insulator integrated together which achieves an output in the vicinity of 10 KV at a low power consumption. Furthermore, other desirable features and characteristics of the present invention will become apparent from the subsequent detailed description and the appended claims, taken in conjunction with the accompanying drawings and the foregoing technical field and background.

SUMMARY

A system and apparatus in a vehicle for reducing aerodynamic drag of the vehicle is disclosed.

In one embodiment, a plasma actuator system for reducing aerodynamic drag of a vehicle by discharging plasma is disclosed. The system includes: at least one pair of thin films configured to integrate into a pair of electrodes wherein each of the thin films of the pair of thin films is composed of a thin film piezo-electric material; a dielectric configured as an insulator region to separate each electrode integrated with the thin film piezo-electric material; and a power supply configured to deliver alternating current to each electrode to provide a high voltage output obtained by the thin film piezo-electric material integrated with the pair of electrodes wherein the high voltage output is about 10 kilovolts.

The thin films include: metal nitrides, metal oxides, mixed metal oxides, metal oxynitrides and mixtures thereof. The thin films are affixed to the surface of each electrode of the pair of electrodes. The power supply delivers, from an input alternating current voltage of 5 V and at a resonant frequency of 60 to 70 kHz, an output voltage of 10 KV. Each electrode of the pair of electrodes is offset or overlaps the other. The plasma discharged is a cold plasma. The dielectric material separating the electrode pair is embedded with thin film material and at least one electrode of the electrode pair. The plasma actuator system is configured in segments as a thin filmed piezo-transformer with thin film actuators. The system, further including: modulating power of the power supply to the segments of the piezoelectric transformer and the thin film actuators to control the drag over the vehicle.

In another embodiment, a plasma actuator apparatus for mitigating adverse aerodynamic affects experienced by a vehicle is disclosed. The plasma actuator apparatus includes: a first layer composed of dielectric material; a second layer including: a first and a second electrode residing on the first layer wherein the first electrode has a surface area which is completely covered by the dielectric material of the first layer, and the second electrode has a surface area which is uncovered by the dielectric material of the first layer; and a third layer of thin film material including: a piezo-electric material with a thickness in a 2 nm to 2 µm range wherein the third layer is integrated onto both the covered and uncovered surface areas of the first and second electrodes; and a power supply providing a voltage across the first and second electrodes to generate, via the piezo-electric material of the third layer, a cold plasma output. The piezo-electric material includes: metal oxide material. The power supply delivers, from an input alternating current voltage of 5 V and at a resonant frequency of 60 kHz to 70 kHz, an output voltage of 10 KV. The first electrode is offset from the second electrode. The first electrode overlaps the second electrode. The apparatus, further including: a left positioned plasma actuator configured in a flat design in segments enabling the left positioned plasma actuator to be flush with a surface of the vehicle on the left lateral side to mitigate adverse air flow affects thereby controlling drag over the vehicle wherein the left positioned plasma actuator is a thin filmed actuator. The apparatus, further including: a right positioned plasma actuator configured in a flat design in segments enabling the right positioned plasma actuator to be flush with a surface of the vehicle on the right lateral side to mitigate adverse air flow affects thereby controlling drag over the vehicle wherein the right positioned plasma actuator is a thin filmed actuator.

In yet another embodiment, a plasma actuator system including a thin film piezo transformer with thin filmed actuators in segments for controlling drag of a vehicle is disclosed. The plasma actuator system includes: at least one pair of thin film plasma actuators configured in segments including: a left positioned thin film plasma actuator configured in a flat design enabling the left positioned thin film plasma actuator to be flush with a surface of the vehicle on the left lateral side to mitigate adverse air flow affects; and a right positioned thin film plasma actuator configured in a flat design enabling the right positioned thin film actuator to be flush with a surface of the vehicle on the right lateral side to mitigate adverse air flow affects; wherein at least one pair of thin films is configured to integrate into a pair of electrodes to form the thin film piezo transformer and to enable segment by segment modulation of the thin film plasma actuators to control vehicle drag wherein the thin film piezo electric transformer is coupled to the left and right positioned thin film plasma actuators to enable the flat design wherein each of the thin films of the pair of thin films is composed of a thin film piezo-electric material.

The thin films include: metal nitrides, metal oxides, mixed metal oxides, metal oxynitrides and mixtures thereof. The thin films are affixed to the surface of each electrode of the pair of electrodes. The plasma actuator system, further including: a pair of power supplies coupled to the left and right positioned plasma actuators respectively delivers, from an input alternating current voltage of 5 V and at a resonant frequency of 60 kHz to 70 kHz, an output voltage of 10 KV wherein each electrode of the pair of electrodes is offset or overlaps the other wherein the left and right positioned thin film plasma actuators discharge cold plasma.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
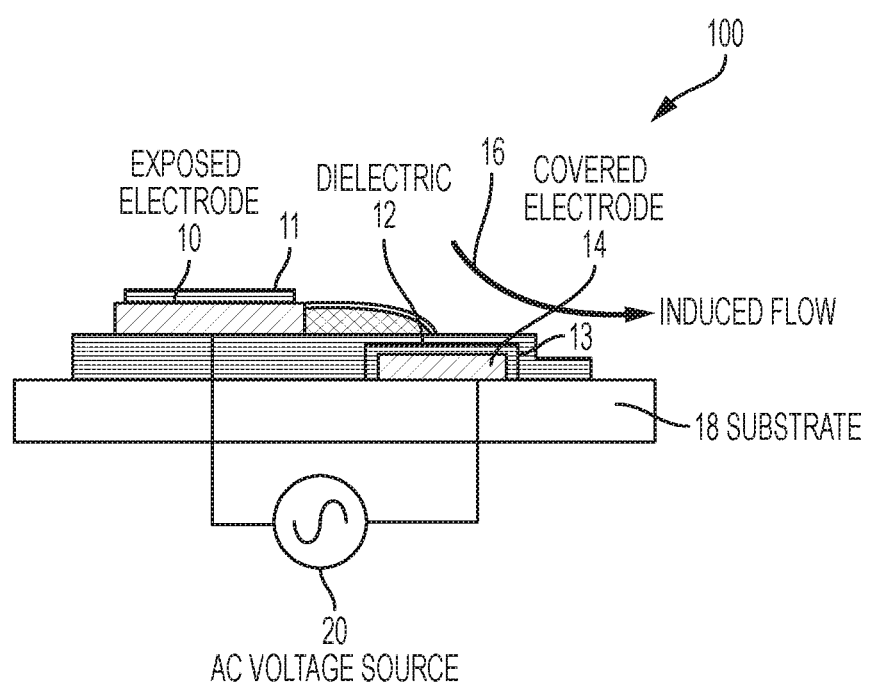
FIG. 1 is a schematic diagram of a cross section view of a plasma actuator, in accordance with an embodiment.

The following detailed description is merely exemplary in nature and is not intended to limit the application and uses. Furthermore, there is no intention to be bound by any expressed or implied theory presented in the preceding technical field, background, summary, or the following detailed description.

While the features of the technology are described primarily in connection with automobiles, the features described by the disclosure are not limited to just automobiles. The described features have broad applicability to different moving objects experiencing air flow drag; for example, have applicability to aircrafts, trucks, trailers, construction equipment, and trains etc. In addition, in particular cases, the features described may also have applicability to stationary or static objects as well experiencing air flow effects.

The subject matter described herein discloses apparatus, systems, techniques and articles for applying a plasma configuration design integrated with piezoelectric resonator that produces a substantial control authority by generating robust jet flows around a vehicle to reduce aerodynamic drag. The plasma configuration design provides a very compact plasma actuator system.

By optimizing the plasma actuator performance, aerodynamic performance is improved. The optimization is influenced by a several factors or variables that result in better plasma distribution and intensity and include improvements in the following areas: voltage waveform, voltage amplitude, frequency, electrode configurations, background gas, dielectric material, dielectric thickness and dielectric temperature. The optimization of the plasma actuator realizes results from the supplied signal based on a geometry of the electrodes.

In various embodiments, the present disclosure provides improved fuel economy, reductions of emissions and carbon dioxide footprint by low aerodynamic drag of the vehicle. The plasma field generated is adjacent and flush to the surface of the vehicle as the plasma actuator system is configured in a highly compact structure. A high voltage piezoelectric transformer simplifies the power supply of a conventional Dc to Dc convertor and enables an output of 10 KV or higher by use of a thin film Piezo electric material and insulator integrated together while allowing for a low Power consumption. The high voltage piezoelectric transformer operates at a resonant frequency of a 5 V/~60 kHz AC input to a piezoelectric source generated ~10 KV AC output.

In various embodiments, the piezoelectric resonators can be composed of a thin film material which provides for a more compact transformer structure than regular or conventional transformer structures. For example, a regular or conventional transformer structure requires one or two coils with a certain geometric size and shape whereas piezoelectric resonators can be configured in a flat, rod shaped, cubical, spherical or any desired or preferred design. Thin film materials provide for additional flexibility for a variety of design configurations of the plasma actuator system.

The piezoelectric resonators are configurable and may be segmented and adaptable to a variety of design and applications. The efficiency is improved by better power transfer. That is, the power transfer is better with piezoelectric as the position of the piezoelectric is "close-by" to the actuator for minimum/no losses than the positioning in a current transformer which would have an associated resultant loss.

The present disclosure describes using a solid-state coupling for power transfer which is more efficient than a transformer which uses the conventional inductive coupling. This is because the solid state coupling enables a power transfer without as much loss and therefore has a better power efficiency.

The present disclosure enables a lower cost design by incorporating a thin-film design in the plasma actuators which also enables more configurability in short segments as well as a scaling up when implementing which in turns results in cost reductions during manufacturing.

FIG. 1 is a schematic diagram of a plasma actuator for reducing drag of fluid flow, air flow as described in the present disclosure. The plasma actuator 100 creates an electric field high enough to cause the electric breakdown of ambient air atoms in the vicinity to cause to dissociate the air atoms into moving ions and electrons.

The first electrode 10 and the second electrode 14 are connected to a power source 20 via two separate connectors. A thin film 11 is affixed and integrated on the first electrode 10 and a thin film 13 is also integrated and affixed to the second electrode 14. While the power source 20 can be configured to deliver any of a wide variety of power outputs in various embodiments, herein the power source 20 is configured to deliver a 10 kV rms. The power source 20 is an AC source. The plasma actuator 100 connected to AC power source 20 generate a larger body force at a much lower voltage compared to the AC plasma actuators. In an exemplary embodiment, the power consumption of the pulsed DC plasma actuator with 40 inches long electrode is approximately 1 kW which is about 100 times less than the AC plasma actuators. As the air flow 16 flows over the plasma actuator when the first electrode 10 and the second electrode 14 are energized with the thin films by the power source 20, the air flow 16 is ionized by the first electrode 10 and the second electrode 14, thus creating a plasma region 22, extending from an edge of the first electrode 10. In an exemplary embodiment, the thickness of the electrode, measured from the top to the bottom in FIG. 1, is about 0.1 mm approximately, the thickness of the dielectric layer, measured from the top to the bottom in FIG. 1, varies from about 0.1 mm to about 6 mm depending on the magnitude of the voltage of the power source. The dielectric layer is in various embodiments configured with a thickness sufficient to prevent a short between the two electrodes 10, 14. The width of the electrode, measured from one side to another side in FIG. 1, is about 25 mm.

The plasma actuator 100 creates the electric field with a first electrode 10 covered by a thin film 11 which covers the exposed area of the first electrode 10. The exposed area of the first electrode 10 faces the air flow 16 and generates the electric field. Next, a second electrode 14 is embedded in a dielectric 12 with a thin film 13 covering at least a surface of the second electrode 14 facing in part the air flow 16, and the second electrode 14 of the plasma actuator rests on a substrate 18. The second electrode 14 can extend to a bottom of the dielectric 12, and contact the substrate 18, as shown in FIG. 1. The substrate 18, and any other part or parts plasma actuator, can be flexible, such as for being shaped to match dimensions of a target vehicle components. The thin films 11 and 13 may cover part of or all of the respective electrodes. The first electrode 10 and the second electrode 14 can be configured in a variety of shapes or forms as long as the electric field created is strong enough. The first electrode 10 and the second electrode 14 form a dielectric barrier discharge (DBD) were as shown in FIG. 1, the first electrode 10 and the second electrode 14 are configured as two flat electrodes where one may be longer than the other and are separated by an insulating dielectric layer of the dielectric 12. This configuration may be referred to as a plasma actuator 100. The plasma actuator 100 is embedded within a surface, leaving only one exposed electrode, the first electrode 10. By applying an alternative high voltage between the first electrode 10 and the second electrode 14, a plasma can be sustained.

In various embodiments, the plasma may be sustained for a longer period with the addition of the thin films 11 and 13. Since the actuator force is a direct result of the electric field in the plasma in regions where there is a net charge density. The force on the plasma is transferred to the neutral background gas through collisions between the ions and the neutral molecules.

In an exemplary embodiment, the electric field is represented by the function $E(x, t)$ between the first electrode 10 and the second electrode 14 with a constant charge density $q(x)$. The strength of the force is then assumed to decrease linearly from a maximum at the edge of the exposed electrode, so that $f(x)=(f(0)-k_1X-k_2Y)$ where $K_1$ and $K_2$ are two constants defining how fast the strength of the force decreases from the actuator.

The thin films may consist of though not limited to mixtures of aluminum nitride, titanium dioxides, zinc oxides, aluminum oxides, aluminum oxy nitride, titanium oxynitride, bismuth iron oxides, copper oxides, mix metal oxide with titanium, iron, zinc, barium, zirconium, hafnium, silicon, potassium, barium etc. and other metallic combinations and mixtures thereof. The metals and compounds may be commercially available or can be prepared by empirical testing.

The film material is a material stack of about 5 to 7 layers which include a combination of a flexible and a rigid material to enable a substantial deformation in structure when transferring an output high voltage of 10 KV or higher. Additionally, ceramic material like an aluminum nitride (AlN) which exhibits a high thermal conductivity yet is considered a uniquely strong dielectric can be stacked with carbon or other material including piezopolymers depending on the output needed. The modulus (i.e. measurement of elasticity) of film and the corresponding bendable properties like a compressible spring structure may be used in the stacking. That is, thin film material can be designed similarly with material of choice in stacks of a thickness of up to 20 nm to 5 micrometers. Also, thinner layers of material may be used that are better in instances when more layers of thin film material are required or needed. The thin film enables a higher frequency of piezo crystals to be used.

The thin film can be deposited by ion beam assisted sputtering processes and other ion assisted deposition methodologies customarily used. Other manufacturing methods like or including: radio frequency (RF) magnetron sputtering, pulsed DC sputtering, pulsed laser deposition, atomic layer deposition (ALD) etc. can also be used instead. Layer thickness 2-10 nm would be most preferred layer thickness with total stack thickness of <50 nm for a nanoscale piezoelectric device. This type of configuration of thin film stack would be there. The voltage gain would be the length multiplied by layers divided by thickness of layers and the constant. The voltage gain is expressed as follows:

$$V_{gain} = \frac{(\text{length})(\text{Layers})}{\text{Thickness}} \times g,$$

where: g is a material coefficient of thickness.

Also, rationale for operating in an alternative way rather than in a direct way include a lower breakdown voltage requirement and the lack of a strong continuous current that would lead to higher power consumption and electrode corrosion. The size of the electrodes is typically of the order of 1 to 10 centimeter for flow actuation purposes, and the voltage used is in the range of 10 kV at an alternative frequency of approximately 70 kHz. The thin films are in a thickness of a range of 2 nm to 10 nm.

In various embodiments, a leading edge of the first electrode 10 is spaced (laterally in the view of FIG. 1) from a leading edge of the dielectric 12. The momentum generated by the force is directed from the exposed electrode to the embedded one, even though an alternative voltage is applied. This is caused by the asymmetry between the two electrodes. As a result, the actuator can be utilized to create a downstream jet-stream from the exposed electrode for the directional flow required.

In various embodiments, a leading edge of the second electrode 14 is below or adjacent to a trailing edge (in the direction of the air flow 16) of the first electrode 10, in a direction of the air flow 16 in operation. The electrodes are in some implementations positioned so that they at least partially overlap (in a vertical direction of the view of FIG. 1, and in others so that they do not overlap at all.

Figure 2:
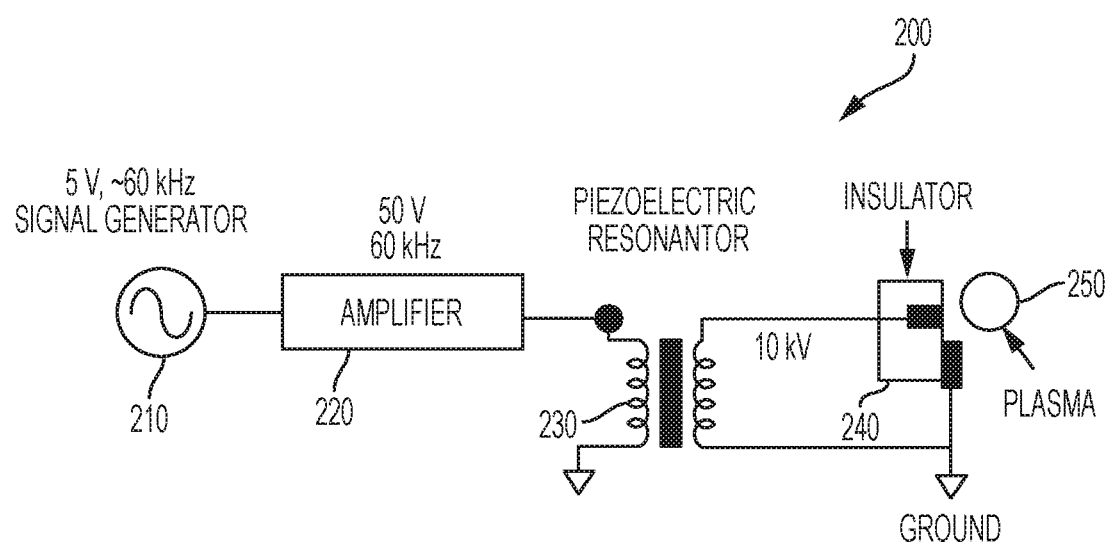
FIG. 2 is a schematic diagram of a plasma actuator, in accordance with an embodiment.

FIG. 2 illustrates another schematic of the plasma actuator 200 of the present embodiment in accordance with the disclosure. FIG. 2 shows the piezo electric discharge system and is illustrated in conjunction with elements of FIG. 1 of a first electrode 10 disposed above a dielectric layer 24 and has a surface area which is uncovered and exposed to the air flow 16 and a second electrode 14 disposed at least partially within a substrate 18. The substrate 18 may be smaller than the dielectric layer 24. The first electrode 10 and the second electrode 14 are connected to the power source 210 which is an AC power source of 5 V oscillating at a frequency of 60 kHz. An amplifier 220 increases the voltage to 50 V prior to the step-up transformer 230. The step-up transformer 230 steps up the voltage to 10 KV with the piezo-electric resonator. The electric field is created next to or adjacent to the insulator 240 and the ionized ions are found in the plasma 250. Similar to what has been described for FIG. 1; in FIG. 2, as the air flow 16 flows over the first electrode 10 and the electrodes with the thin films are energized, the air is ionized and forms a plasma 250 after of the trailing edge of the first electrode 10. The plasma injects energy into the boundary layer of the air flow, thus delaying the flow separation.

Figure 3:
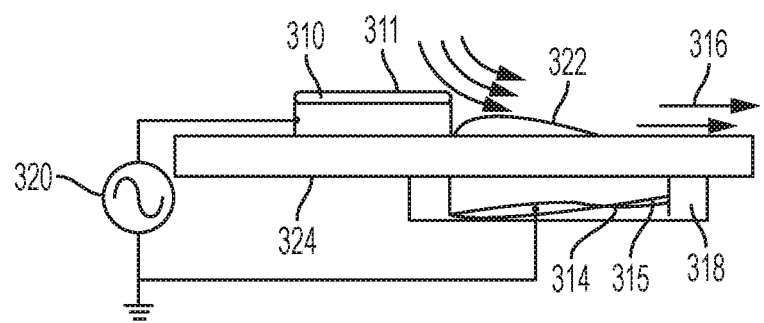
FIG. 3 is an illustration of flow control, in accordance with an embodiment.

FIG. 3 illustrates the air flow over the electrodes. As the air flow 316 flows over the thin film material 311 on top of the first electrode 310 and the electrodes are energized with the thin film material 311, the air is ionized and forms a plasma region 322 at the trailing edge of the first electrode 310. The plasma injects energy into the boundary layer of the air flow delaying the flow separation. Piezoelectric discharge plasma is a cold plasma air discharge of a high voltage piezoelectric transformer. The output of 10 KV obtained and the thin film Piezo electric material and insulator integrated together. The output of 10 KV or more can be obtained with a thin film piezo electric material and insulator integrated together while requiring only a low power consumption. The second electrode 314 is integrated with the thin film 315 and is disposed within the substrate 318. The first electrode 310 and the second electrode 314 are connected to the power supply 320. The relatively high voltage required is generated by a solid-state coupling for power transfer which is more efficient than a transformer which uses the inductive coupling. Solid state transfer will have better power efficiency.

Figure 4:
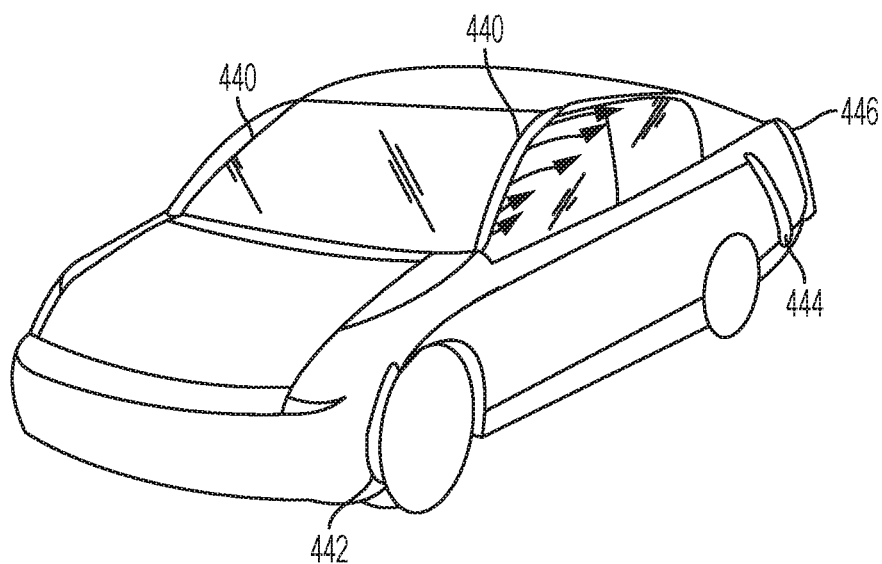
FIG. 4 is an illustration of a vehicle equipped with plasma actuators, in accordance with an embodiment.

FIG. 4 illustrates an automobile body with plasma actuators placed on different surfaces. The plasma actuator is configured in a flat design enabling the positioned plasma actuator to be flush with a surface of a vehicle on a lateral side to mitigate adverse air flow affects. As a first example, the plasma actuator can be placed on flush A-pillars 440 to reduce any vortex generally present around the A-pillars 440. The plasma actuator can be positioned, more particularly, on or flush to each A-pillar, such as by being positioned slightly fore or aft of the pillar. The plasma actuator can be configured to extend along any of various lengths of the pillar, including along substantially all, or an entirety, of the pillar, as shown in FIG. 4. The plasma actuator is in various embodiments curved and/or otherwise shaped to match dimensions of the pillar, and/or the plasma actuator includes materials (some or all) sufficient to render the plasma actuator flexible enough to be shaped to (e.g., bend with bend of the pillar) for a more flush fit. A plasma actuator according to the present technology can be used at any of the vehicle pillars, such as at any one or more of the B-pillars and C-pillars.

A plasma actuator can also be placed around the front fender skirt 442 to control front tire flow separation and to reduce the front tire wake. The plasma actuator can be positioned at or adjacent the skirt, and along any length thereof. And again, the plasma actuator is in various embodiments curved and/or otherwise shaped to match dimensions of the skirt, and/or the plasma actuator includes materials (some or all) sufficient to render the plasma actuator flexible enough to be shaped to (e.g., bend with a bend of the skirt) for a flush fit. The plasma actuator can be in such cases to be positioned around the corresponding vehicle component—e.g., around the skirt.

A plasma actuator can further be placed at or adjacent the rear fender 444 (e.g., a leading edge of the rear fender), and/or a plasma actuator can also be positioned at or adjacent the rear fender tail edge 446 to control separation of the rear flow boundary layer and the resulting wake region. Again, the plasma actuator can be positioned at or adjacent the rear fender or rear-fender tail edge, and along any lengths thereof. And again, the plasma actuator is in various embodiments curved and/or otherwise shaped to match dimensions of the fender or edge, and/or the plasma actuator includes materials (some or all) sufficient to render the plasma actuator flexible enough to be shaped to the render or rear-fender tail edge (e.g., bend with a bend of the rear fender or rear-fender tail edge) for a flush fit. Plasma actuators can be in such cases to be positioned around the corresponding vehicle component—e.g., around the rear fender or the rear-fender tail edge.

Figure 5:
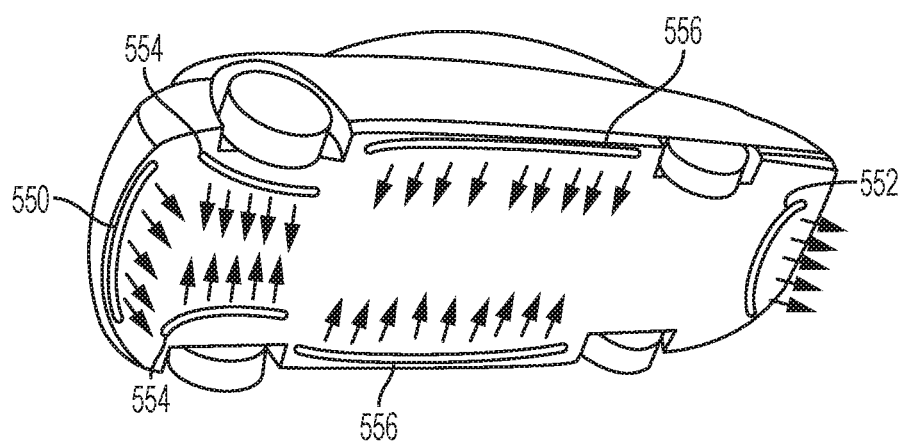
FIG. 5 is an illustration of a vehicle equipped with plasma actuators, in accordance with an embodiment.

The plasma actuator can be placed in many other places on the body of an automobile where air disturbance may be present. For example, FIG. 5 illustrates example locations on exposed vehicle surface(s) under the chassis of an automobile where the plasma actuator can be placed. The plasma actuator can be placed under the front air dam 550, around the underbody strakes 552, 554, 556. By placing the plasma actuators on these locations under the chassis, the air disturbance can be reduced and consequently the drag reduced.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A plasma actuator system for reducing aerodynamic drag of a vehicle by discharging plasma, the system comprising: at least one pair of thin films configured to integrate into a pair of electrodes wherein each of the thin films of the pair of thin films is composed of a thin film piezo-electric material; a dielectric configured as an insulator region to separate each electrode integrated with the thin film piezo-electric material; and a power supply configured to deliver alternating current to each electrode to provide a high voltage output obtained by the thin film piezo-electric material integrated with the pair of electrodes wherein the high voltage output is about 10 kilovolts.

2. The system of claim 1, wherein the thin films comprise: metal nitrides, metal oxides, mixed metal oxides, metal oxynitrides and mixtures thereof.

3. The system of claim 2, wherein the thin films are affixed to the surface of each electrode of the pair of electrodes.

4. The system of claim 1, wherein the power supply delivers, from an input alternating current voltage of 5 V and at a resonant frequency of 60 to 70 kHz, an output voltage of 10 KV.

5. The system of claim 1, wherein each electrode of the pair of electrodes is offset or overlaps the other.

6. The system of claim 1, wherein the plasma discharged is a cold plasma.

7. The system of claim 1, wherein the dielectric material separating the electrode pair is embedded with thin film material and at least one electrode of the electrode pair.

8. The system of claim 1, further comprising: modulating power of the power supply to the segments of the piezo-electric transformer and the thin film actuators to control the drag over the vehicle.

9. A plasma actuator system for mitigating adverse aerodynamic affects experienced by a vehicle, the plasma actuator system comprising: a first layer composed of dielectric material; a second layer comprising: a first and a second electrode residing on the first layer wherein the first electrode has a surface area which is completely covered by the dielectric material of the first layer, and the second electrode has a surface area which is uncovered by the dielectric material of the first layer; and a third layer of thin film material comprising: a piezo-electric material with a thickness in a 2 nm to 2 m range wherein the third layer is integrated onto both the covered and uncovered surface areas of the first and second electrodes; and a power supply providing a voltage across the first and second electrodes to generate, via the piezo-electric material of the third layer, a cold plasma output.

10. The system of claim 9, wherein the piezo-electric material comprises: metal nitrides, metal oxides, mixed metal oxides, metal oxynitrides and mixtures thereof.

11. The system of claim 9, wherein the power supply delivers, from an input alternating current voltage of 5 V and at a resonant frequency of 60 kHz to 70 kHz, an output voltage of 10 KV.

12. The system of claim 9, wherein the first electrode is offset from the second electrode.

13. The system of claim 9, wherein the first electrode overlaps the second electrode.

14. The system of claim 9, further comprising: a left positioned plasma actuator configured in a flat design in segments enabling the left positioned plasma actuator to be flush with a surface of the vehicle on the left lateral side to mitigate adverse air flow affects thereby controlling drag over the vehicle wherein the left positioned plasma actuator is a thin filmed actuator.

15. The system of claim 9, further comprising: a right positioned plasma actuator configured in a flat design in segments enabling the right positioned plasma actuator to be flush with a surface of the vehicle on the right lateral side to mitigate adverse air flow affects thereby controlling drag over the vehicle wherein the right positioned plasma actuator is a thin filmed actuator.

* * * * *